3,697,462
LIQUID CURING AGENT FOR EPOXY RESINS COMPRISING A MIXTURE OF AN IMIDAZOLE AND AN ANILINE-FORMALDEHYDE CONDENSATE

Ronald Lee De Hoff, Maplewood, N.J., assignor to R. T. Vanderbilt Company, Inc., New York, N.Y.
No Drawing. Filed Sept. 21, 1970, Ser. No. 74,144
The portion of the term of the patent subsequent to Nov. 10, 1987, has been disclaimed
Int. Cl. C08g 45/10
U.S. Cl. 260—21          9 Claims

ABSTRACT OF THE DISCLOSURE

The specification relates to a liquid curing agent for epoxy resins. The curing agent contains an imidazole compound as a first component, an anilineformaldehyde condensate having a molar ratio from 1.6:1 to 1.7:1 as a second component and a reactive amine diluent as an optional third component. The specification also relates to epoxy resin cured with this curing agent.

---

It is known to apply epoxy resins in film form to paper, glass, metal and wooden substrates as protective coatings, adhesives and sealants. Various ingredients, in the past, have been used to cure epoxy resins. However, the curing agents have not been entirely satisfactory. If a solid curing agent is employed, there may be, after curing, undesirable pockets of uncured epoxy resin. On the other hand, using heat to melt the solid curing agent in the epoxy resin may shorten the pot life.

If a liquid curing agent is used, it may be unstable when stored for a long period of time, such as a year. In other words, the liquid curing agent crystallizes at room temperature or below.

It is also desirable, in certain commercial uses, such as electrical insulation, high temperature adhesives and filament winding, for the epoxy resin to have as high a heat distortion temperature as possible. An increase in heat distortion temperature indicates an increase in crosslinking of the resin and, therefore, improved chemical resistance. Furthermore, it is advantageous to provide high heat distortion temperatures with a relatively small amount of curing agents.

It has now been discovered that several advantageous features are obtained by employing the curing agent of the present invention. Thus, a new liquid curing agent is prepared by blending or mixing certain imidazole compounds with certain aniline-formaldehyde condensates. However, the curing agent may also contain a reactive amine diluent.

One of the required components in the curing agent of the present invention is an imidazole component. As defined herein an imidazole includes imidazole compounds, addition products thereof and salts thereof as described herebelow which is liquid between about 10° to 200° C.

In a first embodiment, the imidazole component may be a compound within the purview of the following generic structure:

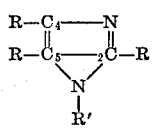

wherein each R is independently selected from the group consisting of hydrogen, $C_1$ to $C_4$ alkyl and phenyl which as defined herein includes substituted phenyl and R' is selected from the group consisting of hydrogen and $C_1$ to $C_4$ alkyl. This includes the following specific compounds among others:

imidazole;
2-methylimidazole;
2-ethyl-4-methylimidazole;
2-ethyl-5-methylimidazole;
2-methyl-4-ethylimidazole;
2-methyl-5-ethylimidazole;
1-methylimidazole;
1-butylimidazole;
2,4-dimethylimidazole;
2,5-dimethylimidazole;
4-butyl-5-ethylimidazole;
2-butyl-4-methylimidazole;
2-butyl-5-methylimidazole;
2,4,5-tripropylimidazole;

and mixtures thereof. These imidazole compounds are well known in the art.

In a second embodiment of the invention, the imidazole component may be an addition product of imidazole or substituted imidazole (as defined by the aforementioned generic structure for the first embodiment) and a monoepoxide having 2 to 13 carbon atoms. This includes the following compounds among others: ethylene oxide, propylene oxide, butylene oxide, butyl glycidyl ether, phenyl glycidyl ether, cresyl glycidyl ether and p-tertiarybutyl phenyl glycidyl ether. Therefore, one or more of the aforementioned substituted imidazoles can be reacted with a monoepoxide, e.g., propylene oxide, or unsubstituted imidazole can be reacted with a monoepoxide, e.g., propylene oxide. The substituted imidazole, moreover, can be mixed with unsubstituted imidazole and this mixture can be reacted with propylene oxide or the like. The imidazole reactant may contain about 0% to 100 mole percent of substituted imidazole and about 100% to 0 mole percent of unsubstituted imidazole. A specific mixture may contain about 10 to 80 mole percent of substituted imidazole and about 90 to 20 mole percent of unsubstituted imidazole.

Propylene oxide or other monoepoxide in the second embodiment of this invention is reacted, for instance, in approximately stoichiometric amounts with the substituted imidazole alone or unsubstituted imidazole alone or mixtures thereof. The reaction is conducted at elevated temperatures which are generally above the melting point of the imidazoles, such as about 100° to 150° C., preferably about 110° to 130° C. The time will vary accordingly, such as about 1 to 8 hours, in order to form a liquid reaction product.

The imidazole component in a third embodiment of the invention may be a salt formed by reacting imidazole, a substituted imidazole or an imidazole addition product (as described heretofore for the first and second embodiments with any suitable compounds, such as an organic or inorganic acid, e.g., phosphoric acid, azelaic acid, lactic acid and monocarboxylic acids having 1 to 8 carbon atoms (formic acid, acetic acid, propionic acid and the like).

The salt of the third embodiment can be prepared by any suitable method. One method, among others, is adding the imidazole component to the acid slowly and in approximately stoichiometric amounts at about 70° to 150° C. in an open beaker containing a magnetic stirrer.

A second required component in the curing agent of this invention besides the forementioned imidazole component is a liquid aniline-formaldehyde condensate prepared by combining aniline and formaldehyde in a molar ratio of 1.6:1 to 1.7:1. These liquid aniline-formaldehyde condensates are deemed to contain a substantial number of secondary amine hydrogen atoms and to correspond to the structure:

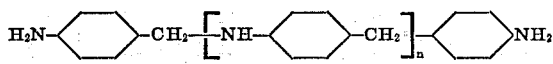

where $n$ approaches 1 and this is based on the stoichiometry of its reaction with epoxide groups. A typical compound is prepared under acid conditions by slowly adding at room temperature 1.0 mole of formaldehyde (as 37% aqueous solution) to 1.6 moles of aniline. When the addition is complete, the mixture is heated to 95° C. and it is held for two hours. The reaction mixture is neutralized with sodium hydroxide and the condensate is then recovered.

It is critical for the aniline-formaldehyde condensate to have the aforementioned molar ratio within the range of 1.6:1 to 1.7:1 in order to have both a clear viscous liquid at room temperature and a low viscosity liquid, e.g., about 100 to 200 centipoises, at about 70° C., the temperature at which epoxy resin mixing is usually performed. Those condensates with a ratio below 1.6:1 are too viscous at 70° C. On the other hand, aniline-formaldehyde condensates with a ratio above 1.7:1 are unstable liquids or are solids. This is demonstrated in the following table:

| Aniline-formaldehyde ratio | Physical state | |
|---|---|---|
| | Room temperature | 70° C. |
| 1.3:1 | Clear viscous liquid | Highly viscous liquid. |
| 1.44:1 | do | Do. |
| 1.6:1 | do | Low viscosity liquid. |
| 1.7:1 | do | Do. |
| 1.8:1 | Unstable cloudy viscous liquid with crystals present. | Do. |
| 1.9:1 | Solid | Solid. |
| 2.0:1 | do | Do. |

It is optional in this invention to include a reactive amine diluent as a third component in the curing agent. The reactive amine diluents are well known in the art [Lee et al., Handbook of Epoxy Resin, McGraw-Hill Book Co., pp. 7-9 to 7-11, New York (1967)] and include, among others, the following compounds: liquid aliphatic polyamines, such as diethylene triamine, triethylene tetramine and tetraethylene pentamine etc.; liquid polyether polyamines, such as polyoxypropylene diamine; hydroxyalkylamines, such as monoethanolamine, diethanolamine, triethanolamine, aminoethyl propanol, and aminoethyl propanediol; alicyclic amines, such as N-aminoethylpiperazine and diaminomenthane; quinolines, such as trimethyl dihydroquinoline; aromatic diamines, such as ortho-, meta-, and paraphenylenediamines; and mixtures thereof.

Generally, the curing agent contains about 0.1 to 5%, preferably about 2 to 5%, of the imidazole component and about 99.9 to 95%, preferably about 98 to 96%, of the aniline-formaldehyde condensate component. If a reactive amine diluent is employed, it may be used in an amount from about 1% to 50%, preferably about 5% to 30%, of the curing agent. The components for the curing agent can be mixed by any suitable procedure.

The liquid curing agent of the invention, which has an imidazole component and a 1.6:1 to 1.7:1 aniline-formaldehyde condensate component and optionally a reactive amine diluent, can be used as a curing agent for epoxy resins. Epoxy resins (polyepoxides) are well known in the art [Polymer Processes, Schildkneckt, pp. 429-474 (1956)]. For instance, it is known to react epichlorohydrin or the like with a diphenol, bisphenol, glycerol, certain fatty acids or the like, then dehydrohalogenate to form an epoxy resin polymer. A specific epoxy resin is the dehydrohalogenated reaction product of epichlorohydrin and bisphenol-A, i.e., 2,2'-bis(p-hydroxyphenyl)-propane, which is considered to have the following structure:

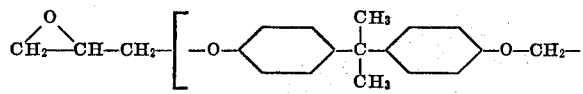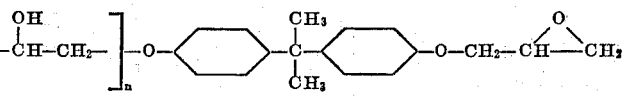

The epoxy resin can also be an aliphatic ether. Glycerin based epoxide resin, which is the epoxide resin formed from epichlorohydrin and glycerin (Epon 812 from Shell Chemical Company or Vanoxy 112 from R. T. Vanderbilt Company, Inc.), is an example of an aliphatic epoxide resin. Another example of aliphatic epoxide resin is glycidyl ester, Epon 871 or Vanoxy 171, which cures to a flexible or rubbery resin. Other specific examples of epoxy resins are, among others, glycidyl ethers of novalac resins derived from polyhydric phenols by condensation with an aldehyde, followed by reaction with epichlorohydrin in the presence of alkali and those disclosed in U.S. Pat. Nos. 3,394,105, 3,470,132 and 3,477,981 which are incorporated herein by reference. Vicinal resins, such as 1,2-epoxy resins, are preferred.

The curing agent of the invention is used in the epoxy resin in minor amounts, generally about 10 to 50 parts, preferably 15 to 25 parts, per 100 parts of resin (phr.). The curing agent may be incorporated into the epoxy resin by any acceptable procedure.

The epoxy resin may also contain minor amounts of optional ingredients, such as reactive diluents, organic solvents, fillers and the like. By reactive diluents are meant those monoepoxides and other components commonly introduced to change the properties of the cured resins derived from the diglycidyl ether of bisphenol-A. They include such components as butyl glycidyl ether, phenyl glycidyl ether, cresyl glycidyl ether, allyl glycidyl ether and gamma-butyrolactone. Also included are such products as the epoxide derived from a long chain aliphatic alcohol and known as "Epoxide 7" of Procter & Gamble or Vanoxy RD-707 of R. T. Vanderbilt Company, Inc., and the epoxy ester of mixed aliphatic $C_9$-$C_{11}$ monocarboxylic acids consisting principally of acids having a tertiary carbon alpha to the carboxyl and known as "Cardura E" of Shell Chemical Company.

Organic solvents which may be used include lower aromatic hydrocarbons such as benzene, toluene and xylene; lower aliphatic and cycloaliphatic ketones such as acetone, methyl ethyl ketone, diisobutyl ketone, cyclohexanone and methylcyclohexanone; and aliphatic esters of lower monocarboxylic acids such as ethyl acetate, isopropyl acetate, butyl acetate and the like. These are non-reactive toward the glycidyl ether.

Fillers may also be used in conjunction with the epoxy resins. This includes the following among others: talc, silica, alumina and calcium carbonate.

The mixture of epoxy resin, curing agent of the invention and any other ingredients may be cured by any acceptable procedure to form a finished epoxy product. One procedure is to cure at elevated temperatures. The time for curing varies and it is dependent upon the temperature and other conditions, such as humidity. For instance, at a temperature of about 85° to 150° C. the time may be about 1 to 5 hours.

Thus, in accordance with this invention, a new curing agent for epoxy resins has been provided. The curing agent is a liquid, and it is stable against crystallization. Furthermore, epoxy resins when cured with this curing agent have excellent physical properties.

The following examples are submitted to illustrate but not to limit this invention. Unless otherwise indicated, all parts and percentages in the specification and claims are based upon weight.

EXAMPLE I

A mixture was provided from 120 parts by weight of an aniline-formaldehyde condensate having a molar ratio of 1.6:1 and 3.1 parts of 2-methylimidazole at 130° F. Twenty parts of this mixture was blended at 65° C. with 100 parts of Vanoxy 126 epoxy resin of R. T. Vanderbilt Company, Inc., a moderately highly purified diglycidyl ether of bisphenol-A (WPE-185), poured into heat distortion bar molds and cured for two hours at 85° C. and then for three hours at 150° C. After cooling to room temperature, the bars were removed from the mold and subjected to the heat distortion temperature test of ASTM method D-648-56. As controls, 29 parts of the aniline-formaldehyde condensate alone, and 3 parts of the 2-methylimidazole alone were similarly blended with separate portions of Vanoxy 126 (100 parts each) and cured subsequently.

The results of this test are indicated in Table 1.

TABLE 1

|  | A | B | C |
|---|---|---|---|
| Curing agent (phr.): |  |  |  |
| Aniline-formaldehyde condensate | 29 |  | 19.5 |
| 2-Methylimidazole |  | 3 | 0.5 |
| Heat distortion temperature (° C.) | 169 | 140 | 176 |

This example demonstrates the synergistic effect obtained by using a mixture of aniline-formaldehyde condensate and 2-methylimidazole as compared with using either component alone. The heat distortion temperature of the epoxy resin cured with the curing agent of the invention has been increased unexpectedly. Moreover, the curing agent of the invention is stable since it did not crystallize after storage at room temperature for more than one year.

EXAMPLE II

A curing agent was prepared from 100 grams of the aniline-formaldehyde condensate of Example I, 6 grams of polyoxypropylenediamine of 190 molecular weight and 3 grams of 1-(2-hydroxypropyl)imidazole. Eighteen grams of the curing agent were blended with 100 grams of the epoxy resin of Example I, poured into heat distortion bar molds and cured for two hours at 85° C. and then for three hours at 150° C. The heat distortion temperature, determined as in Example I, was 172° C.

EXAMPLE III

One hundred grams of the aniline-formaldehyde condensate of Example I was blended with 3.8 grams of the reaction product of 1 mole of 1-methylimidazole and 1 mole of azelaic acid and 20 grams of polyoxypropylene diamine of 230 molecular weight to form a curing agent. Twenty grams of this curing agent were combined with 100 grams of the epoxy resin of Example I and the resulting mixture was cured for 2 hours at 85° C. and then for 3 hours at 150° C. to determine the heat distortion temperature according to Example I. The heat distortion temperature was 162° C.

EXAMPLE IV

The procedure of Example III was repeated except that the curing agent contained as the imidazole component 4.3 grams of the reaction product of 1 mole of 1-(2-hydroxypropyl) imidazole and 1 mole of azelaic acid. The heat distortion temperature of the cured epoxy resin was 157° C.

EXAMPLE V

Other types of epoxy resins were cured satisfactorily by following the procedure of Example I using the formulations indicated in Table 2.

TABLE 2

| Composition (parts) | D | E | F |
|---|---|---|---|
| Epoxy resin [a] | 100 |  |  |
| Do.[b] |  | 100 |  |
| Do.[c] |  |  | 100 |
| Curing agent [d] | 9.0 | 20.5 | 24.0 |

[a] An epoxide resin derived from dimerized fatty acid and containing terminal glycidyl ester groups (Vanoxy 171 of R. T. Vanderbilt Company, Inc.).
[b] Novalac type of phenolic resin epoxidized with epichlorohydrin (DEN 431 of Dow Chemical Company).
[c] An aliphatic epoxide resin derived from glycerin (Vanoxy 112 of R. T. Vanderbilt Company, Inc.).
[d] A blend of 100 parts of an aniline-formaldehyde condensate having a molar ratio of 1.6:1, 3.2 parts of 1-(3-butoxy-2-hydroxypropyl)imidazole and 20 parts of polyoxypropylene diamine of 230 molecular weight.

Having set forth the general nature and specific embodiments of the present invention, the true scope is now particularly pointed out in the appended claims.

What is claimed is:

1. A liquid curing agent for epoxy resins which comprises about 95 to 99.9% of a liquid aniline-formaldehyde condensate and about 0.1 to 5% of an imidazole; said condensate being formed by combining aniline and formaldehyde in a molar ratio within the range of 1.6:1 and 1.7:1.

2. The curing agent according to claim 1 which contains as an additional component a reactive amine diluent.

3. The curing agent according to claim 1 in which the imidazole is 2-methylimidazole.

4. The curing agent according to claim 1 in which the imidazole is 1-hydroxypropylimidazole.

5. The curing agent according to claim 1 in which the imidazole is the addition product of 1-methylimidazole and azelaic acid.

6. The curing agent according to claim 1 in which the imidazole is the addition product of 1-(2-hydroxypropyl) imidazole and azelaic acid.

7. The curing agent according to claim 1 in which the imidazole is 1-(3-butoxy-2-hydroxypropyl)imidazole.

8. A composition hardenable by heat which comprises an epoxy resin and a curing agent comprising about 95 to 99.9% of a liquid aniline-formaldehyde condensate and about 0.1 to 5% of an imidazole; said condensate being formed by combining aniline and formaldehyde in a molar ratio within the range of 1.6:1 and 1.7:1.

9. A composition according to claim 8 in which the curing agent contains as an additional component a reactive amine diluent.

References Cited

UNITED STATES PATENTS

| 3,539,659 | 11/1970 | De Hoff | 260—834 |
| 3,489,695 | 1/1970 | Green | 260—47 |
| 3,549,592 | 12/1970 | Godfrey et al. | 260—47 |

DONALD E. CZAJA, Primary Examiner

E. C. RZUCIDLO, Assistant Examiner

U.S. Cl. X.R.

260—18 EP, 47 EN, 834